(12) United States Patent
Shahana et al.

(10) Patent No.: US 10,604,210 B2
(45) Date of Patent: Mar. 31, 2020

(54) HUMAN-POWERED VEHICLE CONTROL DEVICE

(71) Applicant: Shimano Inc., Sakai, Osaka (JP)

(72) Inventors: Satoshi Shahana, Osaka (JP); Tadashi Ichida, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/184,642

(22) Filed: Nov. 8, 2018

(65) Prior Publication Data

US 2019/0144070 A1    May 16, 2019

(30) Foreign Application Priority Data

Nov. 15, 2017    (JP) ................................ 2017-220183

(51) Int. Cl.
| | | |
|---|---|---|
| *B62M 6/45* | (2010.01) | |
| *H02P 29/00* | (2016.01) | |
| *B62M 6/55* | (2010.01) | |

(52) U.S. Cl.
CPC ................ *B62M 6/45* (2013.01); *B62M 6/55* (2013.01); *H02P 29/00* (2013.01)

(58) Field of Classification Search
CPC ... B62M 6/50; B62M 6/45; B62M 6/55; B62J 6/00; B62J 99/00; B60K 11/04; B62K 11/04; B62K 25/28; H02P 1/00; H02P 1/04; H02P 1/46; H02P 3/00; H02P 5/00; H02P 7/00

USPC ......... 180/65.1, 65.2, 65.8, 205, 206, 206.3, 180/207, 220; 318/400.01, 700, 701, 721, 318/799, 800, 432
See application file for complete search history.

(56) References Cited

U.S. PATENT DOCUMENTS

| | | | | |
|---|---|---|---|---|
| 5,806,621 | A * | 9/1998 | Soda ........................ | B62M 6/45 180/206.4 |
| 5,857,537 | A * | 1/1999 | Matsumoto .............. | B62M 6/60 180/206.5 |
| 9,896,153 | B2 * | 2/2018 | Tanaka .................... | B62M 23/02 |
| 10,173,749 | B2 * | 1/2019 | Negoro .................... | B62J 6/001 |
| 10,189,541 | B2 * | 1/2019 | Kinpara ................... | B62M 6/60 |
| 10,279,865 | B2 * | 5/2019 | Guida ...................... | B62J 11/00 |
| 10,322,769 | B2 * | 6/2019 | Tanaka .................... | B62M 9/02 |
| 2015/0292934 | A1 * | 10/2015 | Baumgaertner ......... | B62M 6/50 701/22 |
| 2018/0072374 | A1 * | 3/2018 | Kishita .................... | B62M 6/45 |

FOREIGN PATENT DOCUMENTS

JP    9-272486 A    10/1997

\* cited by examiner

*Primary Examiner* — Antony M Paul
(74) *Attorney, Agent, or Firm* — Global IP Counselors, LLP

(57) ABSTRACT

A human-powered vehicle control device is configured to reduce electric power needed to drive a motor. The human-powered vehicle control device includes an electronic controller and a memory. The electronic controller is configured to control a motor that assists in propulsion of a human-powered vehicle in accordance with human driving force and a memory. The electronic controller drives the motor in a case where the human driving force is greater than or equal to a first value. The memory electronic changeably store the first value.

16 Claims, 3 Drawing Sheets

HUMAN-POWERED VEHICLE CONTROL DEVICE

CROSS-REFERENCE TO RELATED APPLICATIONS

This application claims priority to Japanese Patent Application No. 2017-220183, filed on Nov. 15, 2017. The entire disclosure of Japanese Patent Application No. 2017-220183 is hereby incorporated herein by reference.

BACKGROUND

Field of the Invention

The present disclosure generally relates to a human-powered vehicle control device.

Background Information

A known human-powered vehicle control device controls a motor assisting propulsion of a human-powered vehicle. In the prior art, in a case where the charge level of a battery mounted on the human-powered vehicle is less than or equal to a predetermined value, the human-powered vehicle control device automatically controls the motor so that output of the motor is less than human driving force. Patent document 1 discloses one example of a prior art human-powered vehicle control device.

Japanese Laid-Open Patent Publication No. 9-272486

SUMMARY

It is desirable that electric power needed to drive a motor be reduced. One object of the present disclosure is to provide a human-powered vehicle control device that reduces electric power needed to drive a motor.

A human-powered vehicle control device according to a first aspect of the present disclosure includes an electronic controller and a memory accessibly coupled to the electronic controller. The electronic controller is configured to control a motor that assists in propulsion of a human-powered vehicle in accordance with human driving force and a memory. The electronic controller is configured to drive the motor upon determining the human driving force is greater than or equal to a first value that is stored in the memory. The memory is configured to changeably store the first value. In accordance with the first aspect, the first value is changeable. In a case where the first value is set to be a value greater than typical values, electric power needed to drive the motor is reduced. Additionally, the motor is controlled in accordance with human driving force of the rider of the human-powered vehicle.

A human-powered vehicle control device according to a second aspect of the present disclosure includes an electronic controller configured to control a motor that assists in propulsion of a human-powered vehicle in accordance with a human driving force input to the human-powered vehicle. The electronic controller includes multiple control modes and is configured to control the motor in one of the control modes selected by operation of an operating portion. The multiple control modes include a first control mode in which the motor is driven upon determining the human driving force is greater than or equal to a first value and a second control mode in which the motor is driven upon determining the human driving force is greater than or equal to a second value differing from the first value. In accordance with the second aspect, in a case where the motor is controlled in one of the first control mode and the second control mode, electric power needed to drive the motor is reduced as compared to a case where the motor is controlled in the other one of the first control mode and the second control mode. Additionally, the control mode is selected by operation of the operating portion. Thus, the control mode can be selected in accordance with a request of the rider of the human-powered vehicle.

In accordance with a third aspect of the present disclosure, the human-powered vehicle control device according to the second aspect is configured so that the first value is greater than the second value. In accordance with the third aspect, in a case where the motor is controlled in the first control mode, electric power needed to drive the motor is reduced as compared to a case where the motor is controlled in the second control mode.

In accordance with a fourth aspect of the present disclosure, the human-powered vehicle control device according to the second or third aspect further includes a memory. The memory is configured to changeably store the first value. In accordance with the fourth aspect, the first value is changeable in the first control mode. In a case where the first value is set to a value greater than typical values, electric power needed to drive the motor is reduced. Additionally, in the first control mode, the motor can be controlled in accordance with a request of the rider of the human-powered vehicle.

In accordance with a fifth aspect of the present disclosure, the human-powered vehicle control device according to the first or fourth aspect is configured so that the memory is configured so that the first value is changeably stored in the memory in accordance with an input signal input to the electronic controller from an external device. In accordance with the fifth aspect, the first value is changeable using the external device.

In accordance with a sixth aspect of the present disclosure, the human-powered vehicle control device according to the fifth aspect is configured so that the external device allows an input of numeral information. The memory stores numeral information received from the external device as the first value. In accordance with the sixth aspect, the external device is used to input numeral information. This reduces the amount of data stored in the memory.

In accordance with a seventh aspect of the present disclosure, the human-powered vehicle control device according to the fifth aspect is configured so that the memory stores multiple pieces of numeral information to be selected by the external device. The memory stores one of the multiple pieces of the numeral information selected by the external device as the first value. In accordance with the seventh aspect, even in a case where numeral information cannot be input, the first value is changeable using the external device.

In accordance with an eighth aspect of the present disclosure, the human-powered vehicle control device according to any one of the first to seventh aspects is configured so that the first value is 50 W. In accordance with the eighth aspect, the electric power needed to drive the motor is reduced.

In accordance with a ninth aspect of the present disclosure, the human-powered vehicle control device according to any one of the first to eighth aspects is configured so that the human driving force is power calculated based on a rotational torque applied to a crank of the human-powered vehicle and a rotational speed of the crank. In accordance with the ninth aspect, an appropriate value is used as the human driving force, which is referred to for driving the motor. Thus, the motor is appropriately controlled.

In accordance with a tenth aspect of the present disclosure, the human-powered vehicle control device according to any one of the first to seventh aspects is configured so that the first value is 10 Nm. In accordance with the tenth aspect, the electric power needed to drive the motor is reduced.

In accordance with an eleventh aspect of the present disclosure, the human-powered vehicle control device according to any one of the first to seventh aspects or tenth aspect is configured so that the human driving force is a rotational torque applied to a crank of the human-powered vehicle. In accordance with the eleventh aspect, an appropriate value is used as the human driving force, which is referred to for driving the motor. Thus, the motor is appropriately controlled.

A human-powered vehicle control device according to a twelfth aspect of the present disclosure includes an electronic controller controlling a motor that assists in propulsion of a human-powered vehicle in accordance with human driving force and a memory accessibly coupled to the electronic controller. The electronic controller is configured to drive the motor so that an output of the motor is less than or equal to a third value that is stored in the memory. The memory is configured to changeably store the third value. In accordance with the twelfth aspect, the third value is changeable. In a case where the third value is set to a value that is less than typical values, electric power needed to drive the motor is reduced. Additionally, the motor is controlled in accordance with human driving force of the rider of the human-powered vehicle.

In accordance with a thirteenth aspect of the present disclosure, the human-powered vehicle control device according to the twelfth aspect is configured so that the output of the motor is either power or a rotational torque of the motor. In accordance with the thirteenth aspect, an appropriate value is used as the output of the motor, which is referred to for driving the motor. Thus, the motor is appropriately controlled.

In accordance with a fourteenth aspect of the present disclosure, the human-powered vehicle control device according to the twelfth or thirteenth aspect is configured so that the memory is configured so that the third value is changeably stored in the memory in accordance with an input signal input to the electronic controller from an external device. In accordance with the fourteenth aspect, the third value is changeable using the external device.

In accordance with a fifteenth aspect of the present disclosure, the human-powered vehicle control device according to the fourteenth aspect is configured so that the external device allows an input of numeral information. The memory stores numeral information received from the external device as the third value. In accordance with the fifteenth aspect, the external device is used to input numeral information. This reduces the amount of data stored in the memory.

In accordance with a sixteenth aspect of the present disclosure, the human-powered vehicle control device according to the fourteenth aspect is configured so that the memory store multiple pieces of numeral information to be selected by the external device. The memory stores one of the multiple pieces of the numeral information selected by the external device as the third value. In accordance with the sixteenth aspect, even in a case where numeral information cannot be input, the third value is changeable using the external device.

A human-powered vehicle control device according to a seventeenth aspect of the present disclosure includes an electronic controller configured to control a motor that assists in propulsion of a human-powered vehicle in accordance with a human driving force. The controller is configured to drive the motor in a case where the human driving force is greater than or equal to 50 W or greater than or equal to 10 Nm. In accordance with the seventeenth aspect, the electric power needed to drive the motor is reduced.

The human-powered vehicle control device according to the present disclosure reduces electric power needed to drive the motor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
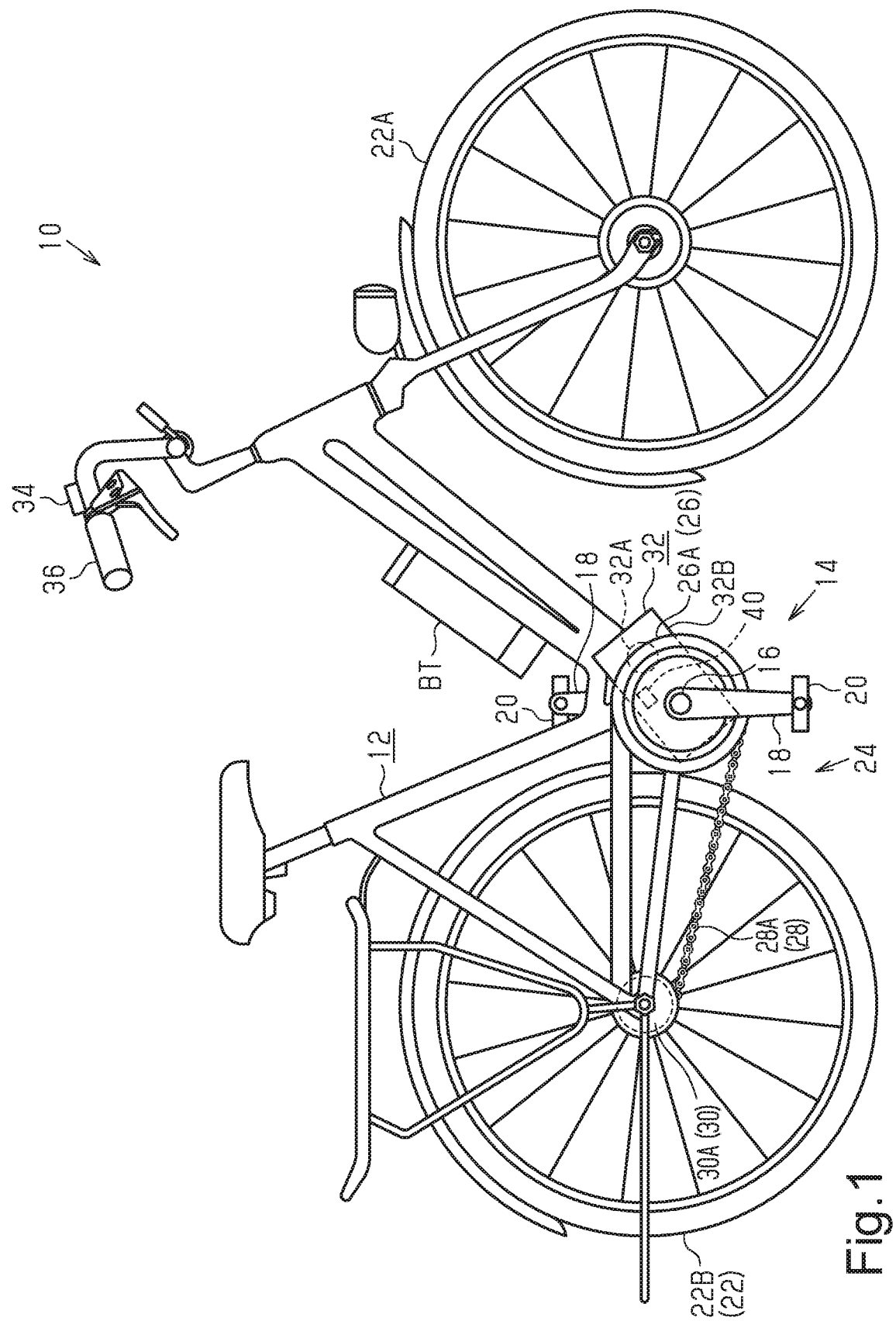
FIG. 1 is a side elevational view of a human-powered vehicle including a first embodiment of a human-powered vehicle control device.

A human-powered vehicle 10 including a human-powered vehicle control device 40 will now be described with reference to FIG. 1. The human-powered vehicle control device 40 is provided on the human-powered vehicle 10. The human-powered vehicle 10 is a vehicle that is driven by at least human driving force. The human-powered vehicle 10 includes, for example, a bicycle. The number of wheels on the human-powered vehicle 10 is not limited. The human-powered vehicle 10 includes, for example, a unicycle and a vehicle having three or more wheels. The bicycle includes, for example, a mountain bike, a road bike, a city bike, a cargo bike, and a recumbent bike. In the embodiments described below, the human-powered vehicle 10 refers to the bicycle.

The human-powered vehicle 10 includes a frame 12, a crank 14, and a drive wheel 22. A human driving force HP is input to the crank 14. The crank 14 includes a crankshaft 15 rotatably supported by the frame 12 and a pair of crank arms 18 respectively provided on the two opposite ends of the crankshaft 16. Each crank arm 18 is coupled to a pedal 20. The drive wheel 22 is supported by the frame 12. The crank 14 and the drive wheel 22 are coupled by a drive mechanism 24. The human-powered vehicle 10 further includes a front wheel 22A and a rear wheel 22B. In the embodiments described below, the rear wheel 22B refers to the drive wheel 22. However, the front wheel 22A can be the drive wheel 22.

The drive mechanism 24 includes a first rotary body 26 coupled to the crankshaft 16. The crankshaft 16 and the first rotary body 26 can be coupled via a first one-way clutch. The first one-way clutch is configured to allow forward rotation of the first rotary body 26 in a case where the crank 14 rotates forward and prohibit rearward rotation of the first rotary body 26 in a case where the crank 14 rotates rearward. The first rotary body 26 includes a front sprocket 26A, a pulley, or a bevel gear. The drive mechanism 24 further includes a coupling member 28 and a second rotary body 30. The coupling member 28 transmits rotational force of the first rotary body 26 to the second rotary body 30. The coupling member 28 includes, for example, a chain 28A, a belt, or a shaft.

The second rotary body 30 is coupled to the rear wheel 22B. The second rotary body 30 includes a rear sprocket 30A, a pulley, or a bevel gear. It is preferred that a second one-way clutch be provided between the second rotary body 30 and the rear wheel 22B. The second one-way clutch is configured to allow forward rotation of the rear wheel 22B in a case where the second rotary body 30 rotates forward and prohibit rearward rotation of the rear wheel 22B in a case where the second rotary body 30 rotates rearward.

The human-powered vehicle 10 further includes a drive unit 32. The drive unit 32 operates so that propulsion of the human-powered vehicle 10 is assisted. The drive unit 32 operates, for example, in accordance with the human driving force HP applied to the crank 14. The drive unit 32 includes a motor 32A. The motor 32A includes an electric motor. The drive unit 32 is driven by electric power supplied from a battery BT mounted on the human-powered vehicle 10.

The battery BT includes one or more battery cells. Each battery cell includes a rechargeable battery. The battery BT supplies electric power to other electric parts electrically connected to the battery BT, for example, the motor 32A and the human-powered vehicle control device 40. The battery BT can be attached to the exterior of the frame 12 or can be at least partially accommodated in the frame 12.

Figure 2:
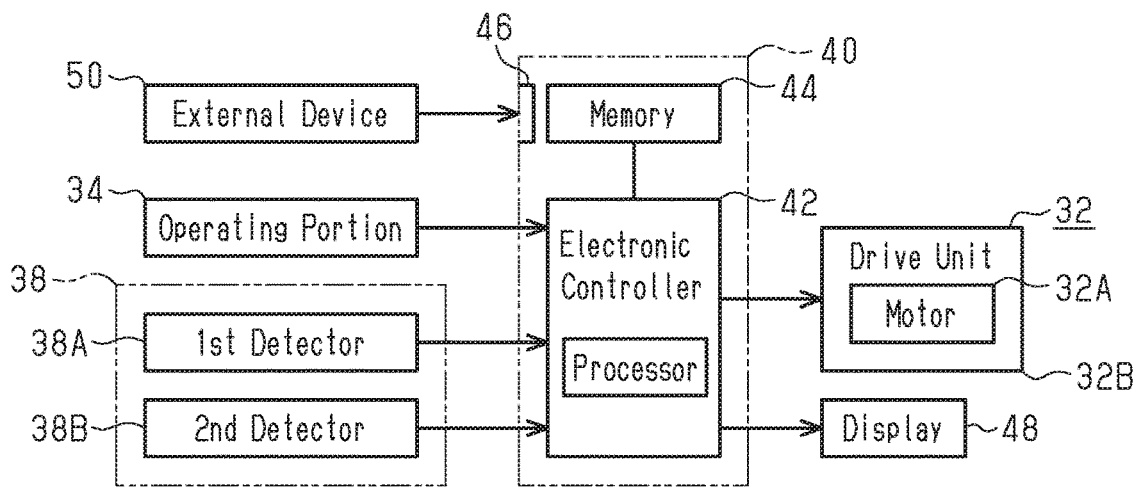
FIG. 2 is a block diagram of the electrical connection relationship of the human-powered vehicle shown in FIG. 1.

As shown in FIG. 2, the human-powered vehicle control device 40 includes an electronic controller 42 and a memory (memory device) 44. The electronic controller 42 will hereafter be referred to simply as the controller 42. The controller 42 controls the motor 32A assisting propulsion of the human-powered vehicle 10 in accordance with the human driving force HP. The controller 42 includes an arithmetic processing unit executing predetermined control programs. The arithmetic processing unit includes, for example, a central processing unit (CPU) or a micro processing unit (MPU) that includes one or more processors. The controller 42 can include one or more microcomputers. The controller 42 can be formed of one or more semiconductor chips that are mounted on a printed circuit board. The term "electronic controller" or "controller" as used herein refers to hardware that executes a software program. The memory 44 stores information used in various control programs and various arithmetic processes. The memory 44 is any computer storage device or any computer readable medium with the sole exception of a transitory, propagating signal. The memory 44 includes, for example, nonvolatile memory or volatile memory. In one example, the human-powered vehicle control device 40 is provided on a housing 32B of the drive unit 32 accommodating the motor 32A (refer to FIG. 1).

The controller 42 is operatively coupled to the motor 32A, and is configured to drives the motor 32A in a case where the human driving force HP is greater than or equal to a first value V1. The controller 42 is configured to have multiple control modes and control the motor 32A in accordance with the control mode selected by operation of an operating portion 34. The operating portion 34 is provided, for example, on a handlebar 36 of the human-powered vehicle 10 (refer to FIG. 1). The operating portion 34 is configured to communicate with the controller 42. The operating portion 34 is connected to perform wired or wireless communication with the controller 42. The operating portion 34 is configured to communicate with the controller 42, for example, through power line communication (PLC). In a case where the operating portion 34 is operated, the operating portion 34 transmits an output signal to the controller 42. The operating portion 34 includes, for example, a push switch, a lever-type switch, or a touchscreen. It is preferred that the human-powered vehicle 10 include a display 48. The display 48 is provided, for example, on the handlebar 36 of the human-powered vehicle 10. The display 48 is configured to show information related to the control mode selected by operation of the operating portion 34.

The multiple control modes include a first control mode MA1 in which the motor 32A is driven in a case where the human driving force HP is greater than or equal to the first value V1 and a second control mode MA2 in which the motor 32A is driven in a case where the human driving force HP is greater than or equal to a second value V2 differing from the first value V1. The first value V1 is greater than the second value V2. The memory 44 stores information related to the first control mode MA1 and the second control mode MA2. The controller 42 drives the motor 32A in accordance with any one of first to third examples described below. In the present embodiment, the controller 42 drives the motor 32A in accordance with the first example.

In the first example, the human driving force HP is power WR calculated based on a rotational torque RT applied to the crank 14 and a rotational speed RS of the crank 14. The power WR is the product of the rotational torque RT and the rotational speed RS. Preferably, the first value V1 is in a range of 30 W or greater and 200 W or less. More preferably, the first value V1 is included in a range of 50 W or greater and 200 W or less. In one example, the first value V1 is 50 W. More preferably, the first value V1 is included in a range of 100 W or greater and 200 W or less. Preferably, the second value V2 is included in a range of 1 W or greater and 30 W or less. In one example, the second value V2 is 1 W. In the first example, the controller 42 drives the motor 32A in the first control mode MA1 in a case where the human driving force HP is greater than or equal to 50 W and drives the motor 32A in the second control mode MA2 in a case where the human driving force HP is greater than or equal to 1 W.

In the second example, the human driving force HP is the rotational torque RT applied to the crank 14. Preferably, the first value V1 is included in a range of 5 Nm or greater and 50 Nm or less. More preferably, the first value V1 is in a range of 10 Nm or greater and 50 Nm or less. In one example, the first value V1 is 10 Nm. More preferably, the first value V1 is included in a range of 20 Nm or greater and 50 Nm or less. Preferably, the second value V2 is included in 1 Nm or greater and 5 Nm or less. In one example, the second value V2 is 3 Nm. In the second example, the controller 42 drives the motor 32A in the first control mode MA1 in a case where the human driving force HP is greater than or equal to 10 Nm and drives the motor 32A in the second control mode MA2 in a case where the human driving force HP is greater than or equal to 3 Nm.

In the third example, the human driving force HP is the power WR and the rotational torque RT. The first value V1 is substantially the same as the first value V1 referred to in the first example and the second example. The second value V2 is substantially the same as the second value V2 referred to in the first example and the second example. The controller 42 drives the motor 32A in the first control mode MA1 in a case where the human driving force HP is greater than or equal to 50 W or greater than or equal to 10 Nm and drives the motor 32A and drives the motor 32A in the second control mode MA2 in a case where the human driving force HP is greater than or equal to 1 W or greater than or equal to 3 Nm. The controller 42 can drives the motor 32A in the first control mode MA1 in a case where the human driving force HP is greater than or equal to 50 W and greater than or equal to 10 Nm and can drive the motor 32A in the second control mode MA2 in a case where the human driving force HP is greater than or equal to 1 W and greater than or equal to 3 Nm.

The memory 44 changeably stores the first value V1. The memory 44 is configured so that the first value V1 is changeable in accordance with an input signal input to the controller 42 from an external device 50. The external device 50 allows an input of numeral information. The memory 44 stores numeral information received from the external device 50 as the first value V1. In one example, in a case where the external device 50 and the controller 42 are set to a mode for changing the first value V1 and numeral information is input to the external device 50, the memory 44 stores the input numeral information as the first value V1.

The external device 50 includes a mobile information device such as a personal computer, a tablet-type computer, a cycle computer, and a smartphone. The human-powered vehicle control device 40 includes an interface portion 46. The interface portion 46 includes at least one of a wired communicator configured to be connected to an electric cable connected to the external device 50 and a wireless communicator configured to perform wireless communication with the external device 50. The interface portion 46 can include only the wired communicator, the wireless communicator, or both of the wired communicator and the wireless communicator. The controller 42 is electrically connected to the interface portion 46 and changes information stored in the memory 44 in accordance with an input signal received via the interface portion 46 from the external device 50. Changing information stored in the memory 44 allows for change in the output aspect of the motor 32A in relation to the human driving force HP even in a case where the controller 42 executes the same control mode.

The controller 42 drives the motor 32A so that output of the motor 32A is less than or equal to a third value V3. In the description hereafter, the output of the motor 32A is referred to as a motor output MO. In one example, the controller 42 drives the motor 32A in the first control mode MA1 so that the motor output MO is less than or equal to the third value V3 and drives the motor 32A in the second control mode MA2 so that the motor output MO is less than or equal to a fourth value V4. The third value V3 and the fourth value V4 specify upper limit values of the motor output MO in the respective control modes MA1 and MA2. The third value V3 and the fourth value V4 are greater than the first value V1 and the second value V2. The motor output MO is the power WR or the rotational torque RT. The controller 42 drives the motor 32A in accordance with any one of fourth to sixth examples described below. In the present embodiment, the controller 42 drives the motor 32A in accordance with the fourth example.

In the fourth example, the motor output MO is the power WR. Preferably, the third value V3 is included in a range of 100 W or greater and 500 W or less. In one example, the third value V3 is 250 W. Preferably, the fourth value V4 is included in a range of 100 W or greater and 500 W or less. In one example, the fourth value V4 is 250 W. In the first example, the controller 42 drives the motor 32A in the first control mode MA1 so that the motor output MO is less than or equal to 250 W and drives the motor 32A in the second control mode MA2 so that the motor output MO is less than or equal to 250 W.

In the fifth example, the motor output MO is the rotational torque RT. Preferably, the third value V3 is included in a range of 30 Nm or greater and 100 Nm or less. In one example, the third value V3 is 70 Nm. Preferably, the fourth value V4 is included in a range of 30 Nm or greater and 100 Nm or less. In one example, the fourth value V4 is 70 Nm. In the second example, the controller 42 drives the motor 32A in the first control mode MA1 so that the motor output MO is less than or equal to 70 Nm and drives the motor 32A in the second control mode MA2 so that the motor output MO is less than or equal to 70 Nm.

In the sixth example, the motor output MO is the power WR and the rotational torque RT. The third value V3 is substantially the same as the third value V3 referred to in the first example and the second example. The fourth value V4 is substantially the same as the fourth value V4 referred to in the first example and the second example. In the third example, the controller 42 drives the motor 32A in the first control mode MA1 so that the motor output MO is less than or equal to 250 W or less than or equal to 70 Nm and drives the motor 32A in the second control mode MA2 so that the motor output MO is less than or equal to 250 W or less than or equal to 70 Nm. The controller 42 can drive the motor 32A in the first control mode MA1 so that the motor output MO is less than or equal to 250 W and less than or equal to 70 Nm and drive the motor 32A in the second control mode MA2 so that the motor output MO is less than or equal to 250 W and less than or equal to 70 Nm.

The memory 44 changeably stores the third value V3. The memory 44 is configured so that the third value V3 is changeable in accordance with an input signal input to the controller 42 from the external device 50. The external device 50 allows an input of numeral information. The memory 44 stores numeral information received from the external device 50 as the third value V3. In one example, in a case where the external device 50 and the controller 42 are set to a mode for changing the third value V3 and numeral information is input to the external device 50, the memory 44 stores the input numeral information as the third value V3.

The human-powered vehicle 10 further includes a detection device 38. The detection device 38 detects the human driving force HP. The detection device 38 outputs a signal corresponding to the human driving force HP. The detection device 38 includes a first detector 38A detecting the rotational torque RT applied to the crank 14 and a second detector 38B detecting the rotational speed RS of the crank 14. The first detector 38A includes, for example, a torque sensor detecting the rotational torque RT applied to the crankshaft 16. The first detector 38A is provided in a transmission path of the human driving force HP extending from the pedals 20 to the drive wheel 22. It is preferred that the first detector 38A be provided in the transmission path of the human driving force HP extending from the pedals 20 to the first rotary body 26. In one example, the first detector 38A is provided at the pedals 20, the crank arms 18, the crankshaft 16, the first rotary body 26, or a coupling member coupling the crankshaft 16 and the first rotary body 26.

The torque sensor can be realized, for example, using a strain sensor, an optical sensor, or a pressure sensor. The strain sensor includes at least one of a strain gauge, a magnetostriction sensor, and a piezoelectric sensor. The strain sensor can include only the strain gauge, the magnetostriction sensor, the piezoelectric sensor, or any combination of the strain sensor, the magnetostriction sensor, and the piezoelectric sensor. Any sensor outputting a signal corresponding to the rotational torque RT about the crankshaft 16 can be used as the torque sensor. In the present embodiment, the torque sensor is provided on or around the coupling member coupling the crankshaft 16 and the first rotary body 26. In a case where the torque sensor rotates together with the crank 14, the detection device 38 includes a wireless communicator. The wireless communicator transmits a signal detected by the torque sensor to the controller 42 through wireless communication. The first detector 38A can be provided, for example, on the frame 12, the coupling member 28, the second rotary body 30, or a hub of the drive wheel 22.

The second detector 38B includes a magnetic sensor outputting a signal corresponding to the strength of a magnetic field. The magnetic sensor is provided on the frame 12 or the housing 32B of the drive unit 32. An annular magnet, the magnetic field strength of which changes in the circumferential direction, is provided on the crankshaft 16, a member rotating in accordance with rotation of the crankshaft 16, or a member rotating integrally with the crankshaft 16 in the transmission path of the human driving force HP between the crankshaft 16 and the first rotary body 26. Use of a magnetic sensor outputting a signal corresponding to the strength of a magnetic field allows the second detector 38B to detect the rotational speed RS of the crank 14.

The controller 42 obtains a signal indicating the rotational torque RT from the first detector 38A and a signal indicating the rotational speed RS from the second detector 38B. The controller 42 calculates the power WR based on the obtained signals indicating the rotational torque RT and the rotational speed RS.

Figure 3:
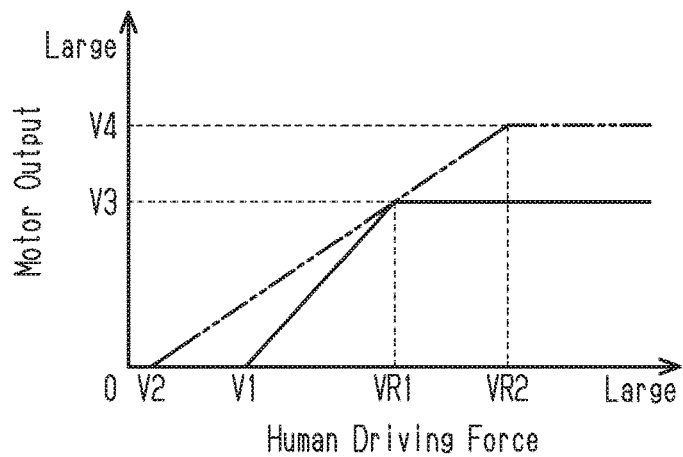
FIG. 3 is a graph showing one example of the relationship between a human driving force and an output of a motor.

One example of the first control mode MA1 and the second control mode MA2 will now be described with reference to FIG. 3. The solid line shown in FIG. 3 shows the relationship between the human driving force HP and the motor output MO in the first control mode MA1. The double-dashed line shown in FIG. 3 shows the relationship between the human driving force HP and the motor output MO in the second control mode MA2.

In a case where the operating portion 34 is operated to select the first control mode MA1, the controller 42 controls the motor 32A in the first control mode MA1. In the first control mode MA1, the controller 42, for example, starts to drive the motor 32A in a case where the human driving force HP is greater than or equal to the first value V1, and drives the motor 32A so that the motor output MO increases in proportion to increases in the human driving force HP. In the first control mode MA1, the controller 42 controls the motor 32A, for example, so that the ratio of the motor output MO to the human driving force HP is equal to a first ratio until the human driving force HP reaches a first human driving force VR1 that is greater than the first value V1.

In the first control mode MA1, for example, in a case where the human driving force HP reaches the first human driving force VR1, the controller 42 drives the motor 32A so that the motor output MO is equal to the third value V3. In the first control mode MA1, in a case where the human driving force HP is greater than or equal to the first human driving force VR1, the controller 42 controls the motor 32A so that the motor output MO maintains the third value V3. As described above, in the first control mode MA1, in a case where the human driving force HP is greater than or equal to the first value V1, the controller 42 controls the motor 32A in accordance with the human driving force HP.

In the first control mode MA1, in a case where the human driving force HP is changed from greater than or equal to the first value V1 to less than the first value V1, the controller 42 stops the driving of the motor 32A. In a case where the motor 32A is controlled in the first control mode MA1, the human-powered vehicle control device 40 reduces electric power needed to drive the motor 32A. The controller 42 can be configured to stop the driving of the motor 32A in the first control mode MA1 in a case where the human driving force HP is changed from greater than or equal to the first value V1 to a value that is less than the first value V1 by a predetermined value Vt. This limits frequent repetitions of the driving and stopping of the motor 32A in a case where the human driving force HP is in the proximity of the first value V1. Preferably, the predetermined value Vt is, for example, in a range of 1 W or greater and 5 W or less or a range of 1 Nm or greater and 5 Nm or less.

In a case where the operating portion 34 is operated to select the second control mode MA2, the controller 42 controls the motor 32A in the second control mode MA2. In the second control mode MA2, the controller 42, for example, starts to drive the motor 32A in a case where the human driving force HP is greater than or equal to the second value V2, and drives the motor 32A so that the motor output MO increases in proportion to increases in the human driving force HP. In the second control mode MA2, the controller 42 controls the motor 32A, for example, so that the ratio of the motor output MO to the human driving force HP is equal to a second ratio until the human driving force HP reaches a second human driving force VR2 that is greater than the second value V2. The second ratio is less than the first ratio.

In the second control mode MA2, for example, in a case where the human driving force HP reaches the second human driving force VR2, which is greater than the first human driving force VR1, the controller 42 drives the motor 32A so that the motor output MO is equal to the fourth value V4. In the present embodiment, the fourth value V4 is greater than the third value V3. In the second control mode MA2, in a case where the human driving force HP is greater than or equal to the second human driving force VR2, the controller 42 controls the motor 32A so that the motor output MO maintains the fourth value V4. As described above, in the second control mode MA2, in a case where the human driving force HP is greater than or equal to the second value V2, the controller 42 controls the motor 32A in accordance with the human driving force HP. In the second control mode MA2, in a case where the human driving force HP is changed from greater than or equal to the second value V2 to less than the second value V2, the controller 42 stops the driving of the motor 32A. The controller 42 can be configured to stop the driving of the motor 32A in the second control mode MA2 in a case where the human driving force HP is changed from greater than or equal to the second value V2 to a value that is less than the second value V2 by the predetermined value Vt.

Second Embodiment

Figure 4:
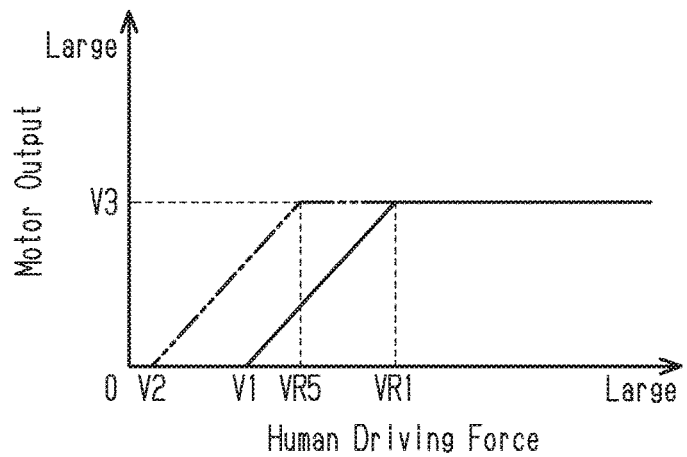
FIG. 4 is a graph showing the relationship between a human driving force and an output of a motor in a second embodiment.

One example of the control modes MA1 and MA2 executed by a second embodiment of the human-powered vehicle control device 40 will now be described with reference to FIG. 4. The human-powered vehicle control device 40 of the second embodiment is the same as the human-powered vehicle control device 40 of the first embodiment except in the control operation of the second control mode MA2. Thus, the same reference characters are given to those elements that are the same as the corresponding elements of the first embodiment. Such elements will not be described in detail. The solid line shown in FIG. 4 shows the relationship between the human driving force HP and the motor output MO in the first control mode MA1. The double-dashed line shown in FIG. 4 shows the relationship between the human driving force HP and the motor output MO in the second control mode MA2.

In a case where the operating portion 34 is operated to select the second control mode MA2, the controller 42 controls the motor 32A in the second control mode MA2. In the second control mode MA2, the controller 42, for example, starts to drive the motor 32A in a case where the human driving force HP is greater than or equal to the second value V2, and drives the motor 32A so that the motor output MO increases in proportion to increases in the human driving force HP. In the second control mode MA2, the controller 42 controls the motor 32A, for example, so that the ratio of the motor output MO to the human driving force HP is equal to the first ratio until the human driving force HP reaches a fifth human driving force VR5 that is greater than the second value V2.

In the second control mode MA2, the controller 42 drives the motor 32A so that the motor output MO is less than or equal to the third value V3. In the second control mode MA2, for example, in a case where the human driving force HP reaches the fifth human driving force VR5, the controller 42 drives the motor 32A so that the motor output MO is equal to the third value V3. In the second control mode MA2, in a case where the human driving force HP is greater than or equal to the fifth human driving force VR5, the controller 42 controls the motor 32A so that the motor output MO maintains the third value V3. In a case where the motor 32A is controlled in the second control mode MA2, the motor 32A is driven so that the motor output MO is less than or equal to the third value V3. Thus, the human-powered vehicle control device 40 reduces electric power needed to drive the motor 32A.

Third Embodiment

Figure 5:
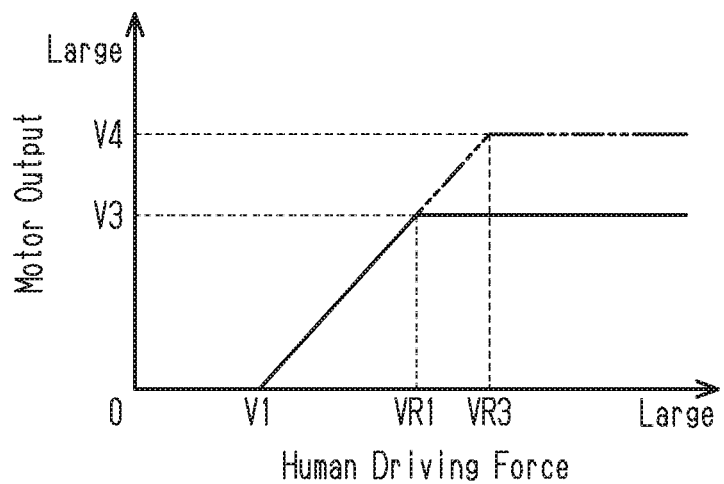
FIG. 5 is a graph showing the relationship between a human driving force and an output of a motor in a third embodiment.

One example of the control modes MA1 and MA2 executed by a third embodiment of the human-powered vehicle control device 40 will now be described with reference to FIG. 5. The human-powered vehicle control device 40 of the third embodiment is the same as the human-powered vehicle control device 40 of the first embodiment except in the control operation of the second control mode MA2. Thus, the same reference characters are given to those elements that are the same as the corresponding elements of the first embodiment. Such elements will not be described in detail. The solid line shown in FIG. 5 shows the relationship between the human driving force HP and the motor output MO in the first control mode MA1. The double-dashed line shown in FIG. 5 shows the relationship between the human driving force HP and the motor output MO in the second control mode MA2.

In a case where the operating portion 34 is operated to select the second control mode MA2, the controller 42 controls the motor 32A in the second control mode MA2. In the second control mode MA2, the controller 42 drives the motor 32A in a case where the human driving force HP is greater than or equal to the first value V1. In the second control mode MA2, the controller 42, for example, starts to drive the motor 32A in a case where the human driving force HP is greater than or equal to the first value V1, and drives the motor 32A so that the motor output MO increases in proportion to increases in the human driving force HP. In the second control mode MA2, the controller 42 controls the motor 32A, for example, so that the ratio of the motor output MO to the human driving force HP is equal to the first ratio until the human driving force HP reaches a third human driving force VR3 that is greater than the second value V2.

In the second control mode MA2, for example, in a case where the human driving force HP reaches the third human driving force VR3, which is greater than the first human driving force VR1, the controller 42 controls the motor 32A so that the motor output MO is equal to the fourth value V4. In the second control mode MA2, in a case where the human driving force HP is greater than or equal to the third human driving force VR3, the controller 42 controls the motor 32A so that the motor output MO maintains the fourth value V4. As described above, in the second control mode MA2, in a case where the human driving force HP is greater than or equal to the first value V1, the controller 42 controls the motor 32A in accordance with the human driving force HP. In the second control mode MA2, in a case where the human driving force HP is less than the first value V1, the controller 42 stops the driving of the motor 32A. The controller 42 can be configured to stop the driving of the motor 32A in the second control mode MA2 in a case where the human driving force HP is changed from greater than or equal to the first value V1 to a value that is less than the first value V1 by the predetermined value Vt. In a case where the motor 32A is controlled in the second control mode MA2, the motor 32A starts to be driven upon determining the human driving force HP is greater than or equal to the first value V1. Thus, the human-powered vehicle control device 40 reduces electric power needed to drive the motor 32A.

Fourth Embodiment

Figure 6:
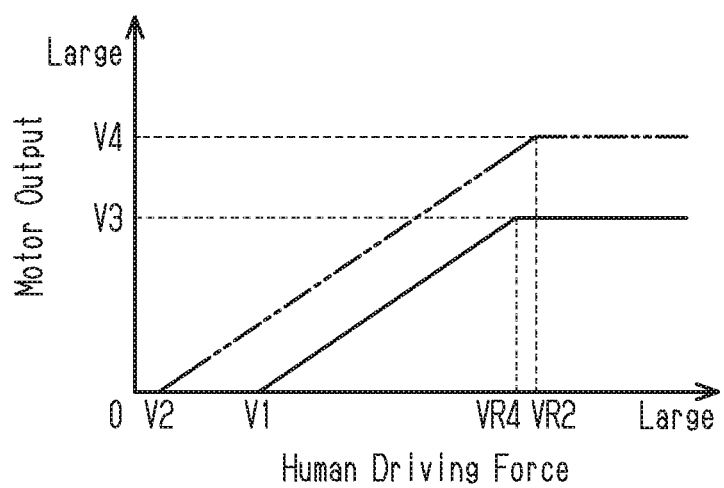
FIG. 6 is a graph showing the relationship between a human driving force and an output of a motor in a fourth embodiment.

One example of the control modes MA1 and MA2 executed by a fourth embodiment of the human-powered vehicle control device 40 will now be described with reference to FIG. 6. The human-powered vehicle control device 40 of the fourth embodiment is the same as the human-powered vehicle control device 40 of the first embodiment except in the control operation of the first control mode MA1. Thus, the same reference characters are given to those elements that are the same as the corresponding elements of the first embodiment. Such elements will not be described in detail. The solid line shown in FIG. 6 shows the relationship between the human driving force HP and the motor output MO in the first control mode MA1. The double-dashed line shown in FIG. 6 shows the relationship between the human driving force HP and the motor output MO in the second control mode MA2.

In a case where the operating portion 34 is operated to select the first control mode MA1, the controller 42 controls the motor 32A in the first control mode MA1. In the first control mode MA1, the controller 42, for example, starts to drive the motor 32A in a case where the human driving force HP is greater than or equal to the first value V1, and drives the motor 32A so that the motor output MO increases in proportion to increases in the human driving force HP. In the first control mode MA1, the controller 42 controls the motor 32A, for example, so that the ratio of the motor output MO to the human driving force HP is equal to the second ratio until the human driving force HP reaches a fourth human driving force VR4 that is greater than the first value V1.

In the first control mode MA1, for example, in a case where the human driving force HP reaches the fourth human driving force VR4, which is greater than the first human driving force VR1, the controller 42 drives the motor 32A so that the motor output MO is equal to the third value V3. In the first control mode MA1, in a case where the human driving force HP is greater than or equal to the fourth human driving force VR4, the controller 42 controls the motor 32A so that the motor output MO maintains the third value V3. In a case where the motor 32A is controlled in the first control mode MA1, the human-powered vehicle control device 40 reduces electric power needed to drive the motor 32A.

Modified Examples

The description related to the above embodiments exemplifies, without any intention to limit, applicable forms of a human-powered vehicle control device of the present disclosure. The human-powered vehicle control device of the present disclosure is applicable to, for example, modified examples of the embodiments described above and combinations of two or more of the modified examples that do not contradict each other. In the modified examples described below, the same reference characters are given to those elements that are the same as the corresponding elements of the embodiments. Such elements will not be described in detail.

In each embodiment and its modified examples, the memory 44 stores multiple pieces of numeral information. The external device 50 is configured to select one of the pieces of numeral information. The memory 44 stores the numeral information selected by the external device 50 as the first value V1. In one example, in a case where the external device 50 and the controller 42 are set to a mode for changing the first value V1 and the external device 50 selects one of the pieces of numeral information, the memory 44 stores the selected piece of numeral information as the first value V1.

In each embodiment and its modified examples, the memory 44 stores multiple pieces of numeral information. The external device 50 is configured to select one of the pieces of numeral information. The memory 44 stores the numeral information selected by the external device 50 as the third value V3. In one example, in a case where the external device 50 and the controller 42 are set to a mode for changing the third value V3 and the external device 50 selects one of the pieces of numeral information, the memory 44 stores the selected piece of numeral information as the third value V3.

In each embodiment and its modified examples, the memory 44 can be configured to changeably store the second value V2. In this case, the memory 44 is configured so that the second value V2 is changeable in accordance with an input signal input to the controller 42 from the external device 50. The memory 44 stores numeral information received from the external device 50 as the second value V2. In one example, in a case where the external device 50 and the controller 42 are set to a mode for changing the second value V2 and numeral information is input to the external device 50, the memory 44 stores the input numeral information as the second value V2. In this example, the memory 44 can be configured to store multiple pieces of numeral information, and the external device 50 can be configured to select one of the pieces of numeral information.

In each embodiment and its modified examples, the memory 44 can be configured to changeably store the fourth value V4. In this case, the memory 44 is configured so that the fourth value V4 is changeable in accordance with an input signal input to the controller 42 from the external device 50. The memory 44 stores numeral information received from the external device 50 as the fourth value V4. In one example, in a case where the external device 50 and the controller 42 are set to a mode for changing the fourth value V4 and numeral information is input to the external device 50, the memory 44 stores the input numeral information as the fourth value V4. In this example, the memory 44 can be configured to store multiple pieces of numeral information, and the external device 50 can be configured to select one of the pieces of numeral information.

In each embodiment and its modified examples, the memory 44 can be configured to changeably store only at least one of the first value V1, the second value V2, the third value V3, and the fourth value V4. The memory 44 can be configured to changeably store only the first value V1, only the second value V2, only the third value V3, only the fourth value V4, or any combination of the first value V1, the second value V2, the third value V3, and the fourth value V4.

In each embodiment and its modified examples, the memory 44 can be configured so that at least one of the first value V1 and the third value V3 is changeable in accordance with an input signal input to the controller 42 from the operating portion 34. The memory 44 can be configured so that only the first value V1, only the third value V3, or both the first value V1 and the third value V3. In this case, the external device 50 is not necessary, and the interface portion 46 can be omitted.

In each embodiment and its modified examples, the first value V1 can be less than the second value V2. In each embodiment and its modified examples, the third value V3 can be greater than the fourth value V4.

In each embodiment and its modified examples, in the first control mode MA1, the controller 42 can be configured to start to drive the motor 32A in a case where the human driving force HP is greater than or equal to the first value V1, and drive the motor 32A so that the motor output MO increases in proportion to increases in the human driving force HP in a convex curve shape or a concave curve shape. In each embodiment and its modified examples, in the second control mode MA2, the controller 42 can be configured to start to drive the motor 32A in a case where the human driving force HP is greater than or equal to the second value V2, and drive the motor 32A so that the motor output MO increases in proportion to increases in the human driving force HP in a convex curve shape or a concave curve shape.

In each embodiment and its modified examples, one of the first control mode MA1 and the second control mode MA2 can be omitted. In this case, the operating portion 34 can be omitted from the human-powered vehicle 10.

In each embodiment and its modified examples, the multiple control modes can include a third control mode MA3 in addition to the first control mode MA1 and the second control mode MA2. In the third control mode MA3, the controller 42, for example, drives the motor 32A in a case where the human driving force HP is greater than or equal to a fifth value V5 and drives the motor 32A so that the motor output MO is less than or equal to a sixth value V6. The fifth value V5 is in the same range as the first value V1 or the second value V2. The sixth value V6 is in the same range as the third value V3 or the fourth value V4. In the third control mode MA3, the controller 42 controls the motor 32A, for example, so that the ratio of the motor output MO to the human driving force HP is equal to a third ratio until the motor output MO reaches the sixth value V6. The third ratio can be equal to the first ratio or the second ratio or can differ from the first ratio and the second ratio. The memory 44 changeably stores at least one of the fifth value V5 and the sixth value V6. The memory 44 changeably stores only the fifth value V5, only the sixth value V6, or both the fifth value V5 and the sixth value V6. The fifth value V5 and the sixth value V6 are changed in the same manner as the first value V1.

In each embodiment and its modified examples, the controller 42 drives the motor 32A in accordance with the first example and the fourth example. However, other than the combination of the first example and the fourth example, the motor 32A can be driven in accordance with any one of the first example, the second example, and the third example and any one of the fourth example, the fifth example, and the sixth example.

What is claimed is:

1. A human-powered vehicle control device comprising:
   an electronic controller configured to be operatively coupled to a motor that assists in propulsion of a human-powered vehicle, the electronic controller being configured to control the motor in accordance with a human driving force input to the human-powered vehicle; and
   a memory accessibly coupled to the electronic controller,
   the electronic controller being configured to drive the motor upon determining the human driving force is greater than or equal to a first value that is stored in the memory, and
   the memory being configured to changeably store the first value in the memory in accordance with an input signal input to the electronic controller from an external device.

2. The human-powered vehicle control device according to claim 1, wherein
   the external device allows an input of numeral information, and
   the memory stores numeral information received from the external device as the first value.

3. The human-powered vehicle control device according to claim 1, wherein
   the memory stores multiple pieces of numeral information to be selected by the external device, and
   the memory stores one of the multiple pieces of the numeral information selected by the external device as the first value.

4. The human-powered vehicle control device according to claim 1, wherein
   the first value is 50 Watts (W).

5. The human-powered vehicle control device according to claim 1 wherein
   the human driving force is power calculated based on a rotational torque applied to a crank of the human-powered vehicle and a rotational speed of the crank.

6. The human-powered vehicle control device according to claim 1, wherein
   the first value is 10 Newton-metres (Nm).

7. The human-powered vehicle control device according to claim 1, wherein
   the human driving force is a rotational torque applied to a crank of the human-powered vehicle.

8. A human-powered vehicle control device comprising
   an electronic controller configured to control a motor that assists in propulsion of a human-powered vehicle, in accordance with a human driving force input to the human-powered vehicle,
   the electronic controller including multiple control modes and being configured to control the motor in one of the control modes selected by operation of an operating portion, and
   the multiple control modes including a first control mode in which the motor is driven upon determining the human driving force is greater than or equal to a first value, and a second control mode in which the motor is driven upon determining the human driving force is greater than or equal to a second value differing from the first value.

9. The human-powered vehicle control device according to claim 8, wherein
   the first value is greater than the second value.

10. The human-powered vehicle control device according to claim 8, further comprising
    a memory configured to changeably store the first value.

11. A human-powered vehicle control device comprising:
    an electronic controller configured to control a motor that assists in propulsion of a human-powered vehicle in accordance with a human driving force input to the human-powered vehicle; and
    a memory accessibly coupled to the electronic controller,
    the electronic controller being configured to drive the motor so that an output of the motor is less than or equal to a value that is stored in the memory, and
    the memory being configured to changeably store the value in the memory in accordance with an input signal input to the electronic controller from an external device.

12. The human-powered vehicle control device according to claim 11, wherein
    the output of the motor is either power or a rotational torque of the motor.

13. A human-powered vehicle control device comprising:
    an electronic controller configured to control a motor that assists in propulsion of a human-powered vehicle in accordance with a human driving force input to the human-powered vehicle; and
    a memory accessibly coupled to the electronic controller,
    the electronic controller being configured to drive the motor so that an output of the motor is less than or equal to a value that is stored in the memory, and
    the memory being configured to changeably store the value in the memory in accordance with an input signal input to the electronic controller from an external device.

14. The human-powered vehicle control device according to claim 13, wherein
    the external device allows an input of numeral information, and
    the memory stores numeral information received from the external device as the value.

15. The human-powered vehicle control device according to claim 13, wherein
    the memory stores multiple pieces of numeral information to be selected by the external device, and
    the memory stores one of the multiple pieces of the numeral information selected by the external device as the value.

16. A human-powered vehicle control device comprising:
an electronic controller configured to control a motor that assists in propulsion of a human-powered vehicle in accordance with human driving force input to the human-powered vehicle, and
the electronic controller being configured to drive the motor upon determining the human driving force is greater than or equal to 50 Watts (W) or greater than or equal to 10 Newton-metres (Nm) so that the motor output is within a prescribed range.

* * * * *